Nov. 22, 1949      J. P. NARDI      2,488,678

FISH LURE

Filed March 2, 1948

INVENTOR:
Joseph P. Nardi
BY Louis Chayka
ATTORNEY.

Patented Nov. 22, 1949

2,488,678

UNITED STATES PATENT OFFICE 2,488,678

FISH LURE

Joseph P. Nardi, Detroit, Mich.

Application March 2, 1948, Serial No. 12,600

6 Claims. (Cl. 43—42.06)

My improvement pertains, generally, to fish lures adapted to be cast by means of a conventional fish rod. More specifically, my invention pertains to fish lures made of transparent material and including movable elements within the body. The object of my invention is to provide a lure which will attract fish by means of air bubbles emitted from the lure while being pulled through water, also by means of movable elements within the body of the lure. Another object of my invention is to provide a lure which, by reason of buoyant movable elements within its body, will itself be made more buoyant.

A further object of my invention is to provide a fish lure of this kind, said fish lure being very simple in construction but fully practical for the purpose designed by me. The lure as improved by me includes a certain novel feature of construction which I shall now describe with reference to the accompanying drawings in which.

Similar numerals refer to similar parts throughout the several views.

Figure 1:
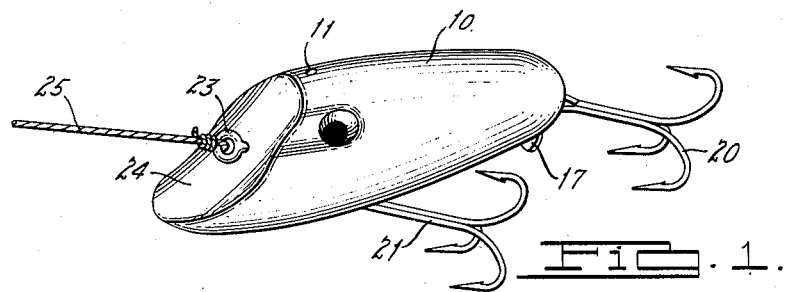
Figure 1 is a perspective view of my lure.
Figure 2:
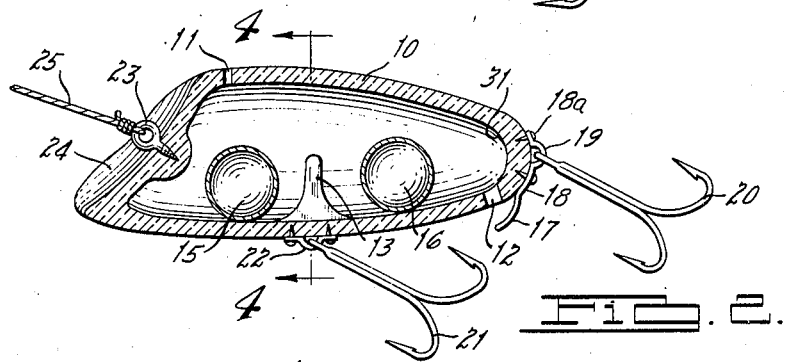
Figure 2 is a longitudinal, sectional view thereof.
Figure 3:
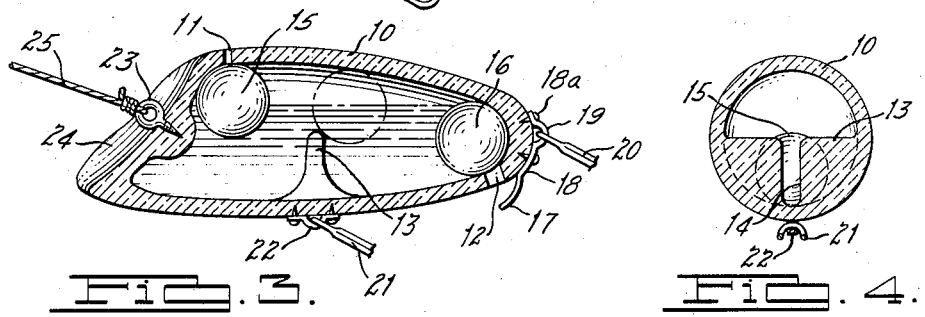
Figure 3 is a sectional view of my lure with elements therein in positions different than those shown in Figure 2.
Figure 4:
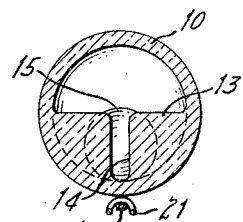
Figure 4 is a transverse, sectional view on line 4—4 of Figure 2.

The body of the lure may be made of any suitable transparent material, preferably plastic, and comprises a hollow shell 10 having a small-diameter aperture 11 in the top wall of its front portion and a similar aperture in its underside at its rear portion as indicated by numeral 12. Disposed transversely within the shell upon the bottom wall thereof, midway its length, is a partition 13 rising upwardly substantially to the longitudinal axis of the lure. The partition is provided with a vertical slot 14 as shown in Figure 4 for a purpose which will be set forth in the course of this description. The partition separates the interior space of the lure into a front and a rear chamber with a hollow, buoyant ball in each of them. The ball in the front chamber is marked 15, the ball in the rear chamber is marked 16, both being of the same size and each staying in its own chamber because the diameter of each ball is larger than the distance between the tip of partition 13 and the upper wall of the lure above the tip.

In a position adjoining the rear aperture 12 in the body 10 of the lure, but inclined towards the front of the lure, is a scoop 17, a spoon-like device, being a part of member 18 affixed to the body of the lure by screws 18a and including an eye 19 for attachment of a cluster of fishhooks 20. A similar cluster of fishhooks 21 may be affixed to the underside of the body of the lure by means of an eye member 22. Affixed to the front end of the lure which, in itself, is scooped to form a spoon-like formation 24, is an eye 23 for attachment of a fishline 25.

Figure 5:
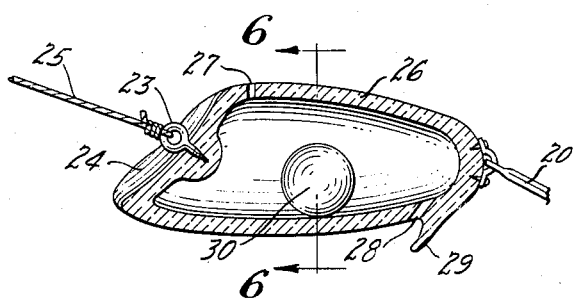
Figure 5 is a longitudinal, sectional view of a modified lure of my invention.
Figure 6:
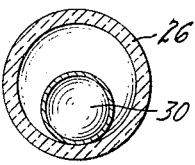
Figure 6 is a transverse, sectional view thereof taken on line 6—6 of Figure 5.

A modified form of my lure is shown in Figure 5 wherein the body of the lure is shown by numeral 26, said body having an aperture 27 at the top, aperture 28 at the rear end of the lure, with a scoop 29 adjoining said aperture 28. A hollow, thin-shelled ball within said shell is indicated by numeral 30.

Now I shall describe the manner in which my lure may be used.

It will be understood that the lure, being hollow, will normally contain a quantity of air within its body. When the lure is cast into water and drawn forwardly by means of line 25, ball 16, by reason or inertia, will be shifted rearwardly where it will fit into the curved outline 31 of the hollow space within the body of the shell 10, occupying a position directly above aperture 12. By reason of the forward motion of the lure, a quantity of water will be diverted by scoop 17 and through aperture 12 into the interior of the lure. Any quantity of water so reaching the interior of the lure will displace therefrom an equal quantity of air, which, leaving the lure through aperture 11 at the top, will form small air bubbles in the water above the lure. The quantity of water so reaching the interior of the lure will be gradual and comparatively small, as said ball 16 will prevent sudden flooding of the interior of the lure. Gradually, however, as the level of water will rise within the lure, ball 15, by reason of its buoyancy, will rise upwardly and partly block outlet 11, so that release of air from the lure will be somewhat retarded. As a result of the action of the balls, the first of which retards the inflow of water, and the second of which retards the outflow of air, the release of air bubbles from the lure will take place during a period protracted long enough to allow the lure to be drawn towards the fisherman by means of a suitable reel. Once the lure is withdrawn from water, the water within the body of the lure will easily flow outwardly through aperture 12. The balls, being buoyant, would float on the surface of the water without interfering with its outflow through said aperture 12 or, possibly, through aperture 11.

With respect to the operation of the lure shown in Figure 5, it is substantially similar except that there is only one ball 30 within the body of the lure. As a result, the ball, in initial stages of the lure being drawn through water, will act to retard the inflow of water into the lure through aperture 28. In later stages, where there is a sufficient quantity of water within the lure, the ball, raised by its buoyancy, will be raised against the upper wall of the lure to partly block outlet 27. The result, obviously, is similar to that shown in the lure described above.

It will be obvious that some changes may be made in the construction of my fish lure without departing from the inventive principle disclosed therein.

What I, therefore, wish to claim is as follows:

1. A fish lure comprising a hollow, fish-like body made of transparent material, said body being provided with a small aperture in its top side at the front portion of the lure body and with a small aperture in the underside at the rear portion of the lure, and buoyant ball means within the body of the lure, the ball means being adapted to retard entry of water into the lure body through the rear aperture and to retard the escape of air from the lure body through the front aperture.

2. A fish lure of the kind described comprising a fish-like body made of thin and transparent material, and being hollow inside, a partition wall disposed transversely on the bottom wall of the body to divide the inner space into a front and a rear chamber, the wall extending upwardly about half the distance from the bottom to the top of the lure body and having a vertical slot therein reaching to the bottom, the body of the lure being provided with a restricted passage in the top of the front chamber and with a restricted passage in the bottom of the rear chamber, a light ball adapted to float on water in each chamber, each ball being adapted to partly block the aperture in its chamber, a forwardly directed scoop back of the aperture on the underside of the lure body to divert water through said aperture into the inside of said lure body, fish-hooks attached to the lure and means at the front of the lure for attachment to a fish line.

3. A lure having a hollow, fish-like body made of transparent material, the body including a transverse partition dividing the interior of said body into two chambers, the front and the rear one, said partition rising from the bottom up to the mid-portion of said body and having a vertical slot therein, a hollow, thin-shelled ball loosely disposed in each chamber, the ball being too large to pass over said partition from one chamber to another, the body of the lure being provided with a small aperture in the upper wall of the front chamber and with an aperture in the lower wall of the rear chamber, each aperture being adapted to be partly blocked by the respective ball, a scoop on the underside of the body of the lure back of the aperture therein and facing forwardly, fish-hooks pivotally affixed to the body and eye means on the body of the lure for attachment to a fish line.

4. A fish lure having an oblong, hollow body provided with a restricted aperture in the bottom rear portion thereof and with a restricted aperture in the top front portion thereof, a buoyant ball within the rear portion of the body to normally retard entry of water through said aperture therein, a buoyant ball within the front part of the body to be raised by water against the aperture therein to retard the release of air from within, and partition means within the body to keep the balls within their respective chambers but permitting water to flow from one to another, fish-hooks affixed to the body of the lure and means on said body for attachment to a fish line.

5. A fish lure comprising a hollow, fish-like body provided with a small aperture in the top side of the body and with a small aperture in the rear portion of the lure body, buoyant-ball means within the body of the lure, the ball means being adapted to retard entry of water into the lure body through the rear aperture and to retard the escape of air from the lure body through said top aperture.

6. A fish lure comprising a hollow, fish-like body provided with a small aperture in its top side at the front portion of said body and with an aperture in the underside at the rear portion of the lure, buoyant ball means within the body of the lure body, the ball means being adapted to retard entry of water into the lure body, through the rear aperture and to retard the escape of air from the lure through the front aperture, and a scoop back of the rear aperture but facing toward the front of the lure body to divert water into the lure body through said rear aperture while the lure body is being pulled forwardly.

JOSEPH P. NARDI.

REFERENCES CITED

The following references are of record in the file of this patent:

UNITED STATES PATENTS

| Number | Name | Date |
| --- | --- | --- |
| 2,028,050 | DeWitt | Jan. 14, 1936 |
| 2,218,421 | Edgar | Oct. 15, 1940 |
| 2,270,487 | Withey | Jan. 20, 1942 |
| 2,445,523 | Goldbach | July 20, 1948 |